Patented Feb. 23, 1937

2,072,016

UNITED STATES PATENT OFFICE 2,072,016

PROCESS FOR THE PRODUCTION OF ALLYL ALCOHOL

Miroslav W. Tamele, Oakland, and Herbert P. A. Groll, Berkeley, Calif., assignors to Shell Development Company, San Francisco, Calif., a corporation of Delaware No Drawing. Application April 21, 1936, Serial No. 75,550

15 Claims. (Cl. 260—156)

This invention relates to a practical and economical process for the production of allyl alcohol from allyl chloride or from materials containing allyl chloride in admixture with one or more substances which are substantially unreactive under the conditions of the process, as hydrocarbons, saturated halides, vinyl type halides and the like.

The invention is preferably executed by treating the allyl chloride, or material containing the same in substantial amount, with an amount of a suitable basic-acting agent at least equivalent to the allyl chloride content of the mixture, in the presence of a substantial amount of water, at an elevated temperature and a pressure at which substantially only hydrolysis of the allyl chloride occurs at a practical rate, and recovering the allyl alcohol from the reaction mixture.

The source of the treated allyl chloride or mixture containing the same is immaterial. Products obtained in the chlorination of propylene, which products may comprise, in addition to allyl chloride, vinyl type chlorides as 1-chlor propene-1, 2-chlor propene-1 and higher chlorinated products, may be treated in accordance with the invention without separating the allyl chloride therefrom. If desired, the allyl chloride can be separated from such a mixture and treated in a pure or substantially pure condition; however, in many cases it may be more advantageous to treat the mixture as such. When a mixture of allyl chloride and vinyl type halides is treated, the allyl chloride is substantially completely hydrolyzed to allyl alcohol while the vinyl type halides are substantially unaffected. Due to the relatively much higher boiling temperature of the allyl alcohol it is usually easier to separate from the vinyl type propenyl chlorides than is allyl chloride. In many cases the presence of one or more vinyl type halides in the reaction mixture may facilitate separation of the allyl alcohol therefrom by forming an azeotrope with water and/or the allyl alcohol.

The basic-acting agent is preferably used in an amount sufficient to react with and neutralize all of the hydrogen chloride liberated in the course of the reaction. Accordingly, the allyl chloride is preferably treated with more than an equivalent quantity of the basic-acting agent to ensure hydrolysis under alkaline conditions.

A suitable basic-acting agent is a material which, under the conditions of execution of the invention, reacts with the hydrogen chloride liberated to neutralize the same but which does not directly react to any substantial extent with the allyl chloride whereby a hydrogen atom of the basic-acting agent is replaced by an allyl radical. The primary object of the invention is to produce allyl alcohol and the reaction is effected in the presence of a substantial amount of water, and basic-acting agents, which are not substantially alkenylated under the conditions of the reaction, are preferably selected.

The invention is preferably executed with basic-acting metal compounds although some non-metallic basic agents are also suitable. Suitable basic metal compounds include the following: the basic metal oxides as the alkali and alkaline earth metal oxides, silver oxide, cadmium oxide, manganese dioxide, lead dioxide, magnesium oxide, and the like; the alkali metal hydroxides as sodium hydroxide, potassium hydroxide and the like; the alkaline earth metal hydroxides as calcium hydroxide, strontium hydroxide and barium hydroxide, other metal hydroxides as magnesium hydroxide, zinc hydroxide, cadmium hydroxide, aluminum hydroxide, zirconium hydroxide, stannous hydroxide, lead hydroxide, chromic hydroxide, ferric hydroxide, ferrous hydroxide, nickel hydroxide, cobalt hydroxide and the like; the alkaline earth metal carbonates and bicarbonates as sodium carbonate, sodium bicarbonate, potassium carbonate, potassium bicarbonate, the alkaline earth metal carbonates as calcium carbonate, barium carbonate and strontium carbonate, other metal carbonates and bicarbonates as magnesium carbonate, basic zinc carbonate, bismuth subcarbonate, etc.; other basic-acting salts as basic lead acetate, bismuth subnitrate and the like and other suitable basic-acting metal compounds. Suitable non-metallic basic-acting agents are the quaternary ammonium bases as $(CH_3)_4NOH$, $(C_2H_5)_4NOH$ and the like and other suitable organic nitrogen bases which are not alkenylated to any substantial extent by the allyl chloride, but which react with the hydrogen chloride liberated during the hydrolysis reaction.

The invention may be executed in any suitable type of apparatus. For example, the allyl chloride, water and basic-acting agent in the desired proportions may be charged in any suitable manner to a suitable reaction vessel as an autoclave which is preferably equipped with appropriate heating and cooling means and means for agitating the reaction mixture as by mechanical stirring. When the basic-acting agent is sufficiently soluble, it may be charged to the reaction vessel as an aqueous solution of the desired concentration. If the selected basic agent is not sufficiently soluble, it may be directly added to the reactor as a solid or added as a suspension in the water and/or the allyl chloride or allyl chloride-containing mixture.

The invention is preferably executed at a temperature of from about 80° C. to about 250° C., although higher or lower temperatures may be employed when desired. Temperatures below about 80° C. may be undesirable due to the low rate of reaction. Temperatures greater than about 250° C. are generally undesirable in that losses due to polymerization of the allyl chloride and allyl alcohol may be prohibitive to the economical execution of the invention. The optimum temperature is dependent upon the basic agent employed. For example, when sodium hydroxide is used, excellent results may generally be obtained at temperatures of from about 100° C. to about 150° C. While with calcium hydroxide, the best results are usually obtained at temperatures of from about 150° C. to about 200° C.

As it is preferable to execute the reaction in the liquid phase, we attain this object by maintaining in the reactor a pressure at least equal to the combined vapor pressure of the reactants and product at the working temperature. When higher pressures than can be attained in this manner are desired, substantially inert materials as hydrocarbons, nitrogen, etc., which are gaseous under the conditions in the system may be applied. The use of superatmospheric pressures also permits us to increase materially the velocity of the hydrolysis reaction since reaction temperatures greater than the atmospheric boiling temperature of the reaction mixture may be used. In general, expensive high-pressure equipment is unnecessary, since advantageous results may be obtained under moderately elevated pressures.

The invention is preferably executed while agitating the reaction mixture by any suitable means as by flow through reactor tubes containing baffles, by mechanical stirring, etc. Agitation of the reaction mixture is advantageous for many reasons. It insures better contact of the reactants and accelerates the reaction rate; it insures reaction in the liquid phase and thus facilitates more complete and rapid reaction of the allyl chloride while the occurrence of undesirable side reactions as polymerization and the like is substantially obviated. When the reaction mixture is agitated, the hydrochloric acid liberated due to the occurrence of the hydrolysis is neutralized by the basic-acting agent before any substantial amount of it can accumulate in the system. Thus, by means of agitation the reactor is protected against excessive corrosion which would occur if hydrogen chloride, in high concentrations, was permitted to accumulate therein. In general, the rate of agitation is dependent upon the temperature; that is, at the higher temperatures it is desirable to agitate more vigorously.

The invention may be executed in a batch, intermittent or continuous manner. If it is desired to dispense with the use of autoclaves equipped with mechanical stirring means, the invention may be executed advantageously, in a continuous manner if desired, by utilizing a tubular reactor. The tubular reactor may comprise reaction tubes of the requisite size connected in series or in multiple through which the reaction mixture of allyl chloride, water and a basic-acting agent is caused to flow at the desired reaction temperature and a superatmospheric pressure. Throughout the length of the reaction tubes, orifice plates or baffles may be provided at such intervals as to keep the reaction mixture in violent turbulence. The tubular reactor is divided into two main parts. The first part is enclosed in a furnace, steam jacket or other suitable heating device which imparts heat to the reaction tubes and heats the reaction mixture to a temperature, preferably from about 80° C. to about 160° C., at which temperature the hydrolysis reaction is initiated. The second part of the reactor or the waiting coil, which is outside of the heating means, is well insulated and of such a length that the heat of reaction raises the temperature of the reaction mixture therein to a predetermined optimum which is dependent upon the particular base used and upon the base-water ratio in the initial mixture. With a particular base, the water content of the reaction mixture can be varied within certain limits to give the optimum temperature in the system for that base. For example, with calcium hydroxide, the reaction is initiated in the heated part of the reactor at about 150° C. and a lime slurry of such a concentration is used that the temperature of the mixture in the waiting coil rises to and is maintained at an optimum temperature of from about 170° C. to about 175° C.

The following specific example illustrates a suitable mode of executing the invention. It is to be understood that the example is submitted for purposes of illustration only and it is not to be regarded as limiting the invention to the reactants, proportion of reactants, conditions of operation and mode of operation therein described.

*Example*

About 2295 grams of a mixture consisting of about 2134.3 gm. (27.8 mols) of allyl chloride and about 160.7 gm. of vinyl type propenyl chlorides as 1-chlor propene-1 and 2-chlor propene-1 was charged to an autoclave equipped with heating and cooling means and means for agitating its contents by mechanical stirring. About 15 kilos of a 10% sodium hydroxide solution were then added to the contents of the autoclave; the autoclave was sealed and the reaction mixture agitated while its temperature was raised to about 110° C. The reaction temperature was maintained at about 110° C., with stirring and with the reaction mixture under a pressure equal to the combined vapor pressures of its constituents at the operating temperature, for about 30 minutes.

At the end of this time the reaction mixture was cooled, discharged from the autoclave and subjected to a fractional distillation. The first fraction consisted of the unchanged vinyl type chlorides which distilled from the mixture as azeotropes with water in the temperature range of from about 40° C. to about 60° C. The second fraction consisted of about 2100 gm. of the azeotrope of allyl alcohol and water boiling at a temperature of about 87.5° C. The allyl alcohol azeotrope was treated with drying agents and the mixture distilled. About 1480 gm. of allyl alcohol which boils at a temperature of from about 95.5° C. to about 97.0° C. was obtained. This represents a yield of about 95% allyl alcohol based on the allyl alcohol consumed.

It is to be understood that other basic-acting agents are just as suitable as the sodium hydroxide used in the above example. Excellent results may be obtained by resorting to the use of less soluble metal hydroxides, for example, the alkaline earth metal hydroxides, magnesium hydroxide, etc. Allyl chloride may be treated with an excess of a lime slurry and the mixture heated to a temperature of from about 150° C. to about 200° C. under a superatmospheric pressure, while agitating the reaction mixture, and substantially completely converted to allyl alcohol in a relatively short period of time. The allyl alcohol may be recovered from the aqueous reaction mixture in any suitable manner as by distillation, extraction and the like.

While we have described our invention in its preferred embodiment, it is to be understood that modifications may be made and that no limitations upon the invention are intended other than those imposed by the scope of the appended claims.

This application is a continuation-in-part of application Serial No. 636,176, filed October 4, 1932.

We claim as our invention:

1. A process for the production of allyl alcohol which comprises reacting allyl chloride with at least an equivalent quantity of a basic-acting agent which is incapable of being alkenylated to any substantial extent by direct reaction with the allyl chloride under conditions at which the allyl chloride is hydrolyzed, in the presence of a substantial amount of water at a temperature greater than 80° C. but below the temperature at which substantial polymerization of the allyl alcohol occurs.

2. A process for the production of allyl alcohol which comprises reacting allyl chloride with at least an equivalent quantity of a basic-acting agent which is incapable of being alkenylated to any substantial extent by direct reaction with the allyl chloride under conditions at which the allyl chloride is hydrolyzed, in the presence of a substantial amount of water at a temperature greater than about 80° C. but below the temperature at which substantial polymerization of the allyl alcohol occurs and under a pressure at least equal to the combined vapor pressures of the constituents of the reaction mixture at the operating temperature.

3. A process for the production of allyl alcohol which comprises reacting allyl chloride with at least an equivalent quantity of a basic metal compound in the presence of a substantial amount of water at a temperature greater than about 80° C. but below the temperature at which substantial polymerization of the allyl alcohol occurs.

4. A process for the production of allyl alcohol which comprises reacting allyl chloride with at least an equivalent quantity of a basic metal compound in the presence of a substantial amount of water at a temperature of from about 80° C. to about 250° C. and under a pressure at least equal to the combined vapor pressures of the constituents of the reaction mixture at the operating temperature.

5. A process for the production of allyl alcohol which comprises reacting allyl chloride with at least an equivalent quantity of a basic metal compound in the presence of a substantial amount of water at a temperature of from about 80° C. to about 250° C. under a pressure at least equal to the combined vapor pressures of the constituents of the reaction mixture at the operating temperature.

6. A process for the production of allyl alcohol from a mixture of allyl chloride with substantially less reactive material which comprises treating the mixture with an amount of a basic metal compound at least equivalent to the allyl chloride-content of the mixture, in the presence of a substantial amount of water, at a temperature of from about 80° C. to about 250° C. and under a pressure at least equal to the combined vapor pressures of the constituents of the reaction mixture at the operating temperature, whereby the allyl chloride is substantially completely converted to allyl alcohol while the other constituents of the treated mixture are substantially unaffected, and recovering the allyl alcohol from the reaction mixture.

7. A process for the production of allyl alcohol from a mixture containing a substantial amount of allyl chloride and substantially less reactive organic halides which comprises treating the mixture with an amount of a basic metal compound at least equivalent to the allyl chloride-content of the mixture, in the presence of a substantial amount of water, at a temperature of from about 80° C. to about 250° C. and under a pressure at least equal to the combined vapor pressures of the constituents of the reaction mixture at the operating temperature, whereby the allyl chloride is substantially completely converted to allyl alcohol while the less reactive organic chlorides are substantially unaffected, and recovering the allyl alcohol from the reaction mixture.

8. A process for the production of allyl alcohol from a mixture of allyl chloride and at least one vinyl type chloride which comprises treating the mixture with an amount of a basic metal compound at least equivalent to the allyl chloride-content of the mixture, in the presence of a substantial amount of water, at a temperature of from about 80° C. to about 250° C. and under a pressure at least equal to the combined vapor pressures of the constituents of the reaction mixture at the operating temperature, whereby the allyl chloride is substantially completely converted to allyl alcohol while the vinyl type halides are substantially unaffected, and recovering the allyl alcohol from the reaction mixture.

9. A process for the production of allyl alcohol which comprises treating a mixture consisting of allyl chloride and vinyl type propenyl chlorides with an amount of a basic metal hydroxide at least equivalent to the allyl chloride-content of the mixture, in the presence of a substantial amount of water, at a temperature of from about 80° C. to about 250° C. and under a pressure at least equal to the combined vapor pressures of the constituents of the reaction mixture at the operating temperature, whereby the allyl chloride is substantially completely converted to allyl alcohol while the vinyl type propenyl chlorides are substantially unaffected, and recovering the allyl alcohol from the reaction mixture.

10. A process for the production of allyl alcohol which comprises reacting allyl chloride with at least an equivalent quantity of a metal hydroxide in the presence of a substantial amount of water at a temperature of from about 80° C. to about 250° C. and under a pressure at least equal to the combined vapor pressures of the constituents of the reaction mixture at the operating temperature.

11. A process for the production of allyl alcohol which comprises reacting allyl chloride with at least an equivalent quantity of an alkali metal hydroxide in the presence of a substantial amount of water at a temperature of from about 80° C. to about 250° C. and under a pressure at least equal to the combined vapor pressures of the constituents of the reaction mixture at the operating temperature.

12. A process for the production of allyl alcohol which comprises reacting allyl chloride with at least an equivalent quantity of an alkaline earth metal hydroxide in the presence of a substantial amount of water at a temperature of from about 80° C. to about 250° C. and under a pressure at least equal to the combined vapor pressures of the constituents of the reaction mixture at the operating temperature.

13. A process for the production of allyl alcohol which comprises reacting allyl chloride with at least an equivalent quantity of magnesium hydroxide in the presence of a substantial amount of water at a temperature of from about 80° C. to about 250° C. and under a pressure at least equal to the combined vapor pressures of the constituents of the reaction mixture at the operating temperature.

14. A process for the production of allyl alcohol which comprises reacting allyl chloride with at least an equivalent quantity of sodium hydroxide in the presence of a substantial amount of water at a temperature of from about 80° C. to about 250° C. and under a pressure at least equal to the combined vapor pressures of the constituents of the reaction mixture at the operating temperature.

15. A process for the production of allyl alcohol which comprises reacting allyl chloride with more than an equivalent quantity of calcium hydroxide in the presence of a substantial amount of water at a temperature of from about 150° C. to about 200° C. and under a pressure at least equal to the combined vapor pressures of the constituents of the reaction mixture at the operating temperature.

MIROSLAV W. TAMELE.
HERBERT P. A. GROLL.